(12) United States Patent
Krueger et al.

(10) Patent No.: US 8,275,924 B2
(45) Date of Patent: *Sep. 25, 2012

(54) SMART DOCK FOR CHAINING ACCESSORIES

(75) Inventors: Scott Krueger, San Francisco, CA (US); Jesse L. Dorogusker, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,378

(22) Filed: Dec. 8, 2010

(65) Prior Publication Data

US 2011/0078354 A1    Mar. 31, 2011

Related U.S. Application Data

(62) Division of application No. 12/193,246, filed on Aug. 18, 2008, now Pat. No. 7,873,771.

(60) Provisional application No. 60/969,858, filed on Sep. 4, 2007.

(51) Int. Cl.
*G06F 13/14* (2006.01)
*G06F 13/10* (2006.01)

(52) U.S. Cl. .......................... 710/303; 710/62

(58) Field of Classification Search ............... 710/8, 15, 710/16, 62–72, 100, 104–105, 300–306
See application file for complete search history.

(56) References Cited

U.S. PATENT DOCUMENTS

| 4,673,861 A | 6/1987 | Dubovsky et al. |
| 4,847,781 A | 7/1989 | Brown, III et al. |
| 5,150,031 A | 9/1992 | James et al. |
| 5,186,646 A | 2/1993 | Pederson |
| 5,428,798 A | 6/1995 | Sekine et al. |
| 5,680,102 A | 10/1997 | Xydis |
| 5,694,137 A | 12/1997 | Wood |
| 5,712,638 A | 1/1998 | Issa |
| 5,754,027 A | 5/1998 | Oglesbee et al. |
| 5,964,847 A | 10/1999 | Booth et al. |
| 5,987,545 A | 11/1999 | Oh |
| 6,012,105 A | 1/2000 | Rubbmark et al. |
| 6,031,797 A | 2/2000 | Van Ryzin et al. |

(Continued)

FOREIGN PATENT DOCUMENTS

CN    1765059 A    4/2006

(Continued)

OTHER PUBLICATIONS

"ipodDock/iPod Cradle," www.bookendzdocks.com/bookendz/dock_cradle.htm, downloaded Feb. 27, 2008. "Express Remote Supports Apple's Airport Express," Press Release, Nov. 10, 2004, Copyright 2005,Keyspan, 2 pages.

"Express Remote; Remote Control for your Mac or PC (URM-17A)", product information datasheet, Copyright 2005, Keyspan, http://www.keyspan.com/products/usb/urm17a/, downloaded Sep. 25, 2005, 2 pages.

(Continued)

*Primary Examiner* — Paul R Myers
*Assistant Examiner* — Trisha Vu
(74) *Attorney, Agent, or Firm* — Kilpatrick Townsend & Stockton LLP (57) ABSTRACT

A system for communicating between an accessory and an electronic device includes a first interface, a second interface, and a docking station. The first interface is configured to communicate with the electronic device. The second interface is configured to communicate with the accessory. The docking station is coupled to the first interface and the second interface. The docking station is configured to receive a set of preferences from the accessory and forward the set of preferences to the electronic device.

23 Claims, 11 Drawing Sheets

U.S. PATENT DOCUMENTS

| | | | |
|---|---|---|---|
| 6,038,457 A | 3/2000 | Barkat | |
| 6,125,455 A | 9/2000 | Yeo | |
| 6,130,518 A | 10/2000 | Gabehart et al. | |
| 6,178,514 B1 | 1/2001 | Wood | |
| 6,204,637 B1 | 3/2001 | Rengan | |
| 6,211,581 B1 | 4/2001 | Farrant | |
| 6,252,380 B1 | 6/2001 | Koenck | |
| 6,283,789 B1 | 9/2001 | Tsai | |
| 6,304,764 B1 | 10/2001 | Pan | |
| 6,314,479 B1 | 11/2001 | Frederick et al. | |
| 6,505,258 B1 | 1/2003 | Sakarda et al. | |
| 6,591,085 B1 | 7/2003 | Grady | |
| 6,608,264 B1 | 8/2003 | Fouladpour | |
| 6,614,232 B1 | 9/2003 | Mukai | |
| 6,653,813 B2 | 11/2003 | Khatri | |
| 6,725,061 B1 | 4/2004 | Hutchison, IV et al. | |
| 6,813,528 B1* | 11/2004 | Yang | 700/94 |
| 6,859,538 B1* | 2/2005 | Voltz | 381/77 |
| 6,879,348 B1 | 4/2005 | Niida | |
| 6,914,551 B2 | 7/2005 | Vidal | |
| 6,928,543 B2* | 8/2005 | Hendry et al. | 713/100 |
| 6,931,456 B2 | 8/2005 | Payne et al. | |
| 7,050,783 B2 | 5/2006 | Curtiss et al. | |
| 7,062,261 B2 | 6/2006 | Goldstein et al. | |
| 7,127,678 B2 | 10/2006 | Bhesania et al. | |
| 7,187,947 B1* | 3/2007 | White et al. | 455/556.1 |
| 7,200,702 B2* | 4/2007 | Keely et al. | 710/303 |
| 7,222,207 B2* | 5/2007 | Falcon | 710/303 |
| 7,283,635 B1 | 10/2007 | Anderson et al. | |
| 7,296,107 B2* | 11/2007 | Lunsford et al. | 710/304 |
| 7,303,282 B2* | 12/2007 | Dwyer et al. | 353/15 |
| 7,549,008 B2 | 6/2009 | Kalayjian | |
| 7,558,894 B1* | 7/2009 | Lydon et al. | 710/105 |
| 7,574,177 B2 | 8/2009 | Tupman | |
| 7,599,177 B2* | 10/2009 | Jaffe et al. | 361/679.41 |
| 7,634,605 B2* | 12/2009 | Laefer et al. | 710/303 |
| 7,647,129 B1 | 1/2010 | Griffin, Jr. | |
| 7,840,740 B2* | 11/2010 | Minoo | 710/303 |
| 7,873,771 B2* | 1/2011 | Krueger et al. | 710/303 |
| 2001/0005641 A1 | 6/2001 | Matsumoto et al. | |
| 2001/0006884 A1 | 7/2001 | Matsumoto | |
| 2001/0033244 A1 | 10/2001 | Harris et al. | |
| 2002/0002035 A1 | 1/2002 | Sim et al. | |
| 2002/0010759 A1 | 1/2002 | Hitson et al. | |
| 2002/0029303 A1 | 3/2002 | Nguyen | |
| 2002/0065074 A1 | 5/2002 | Cohn et al. | |
| 2002/0090982 A1 | 7/2002 | Hollstrom et al. | |
| 2002/0103008 A1 | 8/2002 | Rahn et al. | |
| 2002/0105861 A1 | 8/2002 | Leapman | |
| 2002/0115480 A1 | 8/2002 | Huang | |
| 2002/0132651 A1 | 9/2002 | Jinnouchi | |
| 2002/0145536 A1 | 10/2002 | Clise | |
| 2002/0151327 A1 | 10/2002 | Levitt | |
| 2002/0163780 A1 | 11/2002 | Christopher | |
| 2003/0041206 A1 | 2/2003 | Dickie | |
| 2003/0073432 A1* | 4/2003 | Meade, II | 455/420 |
| 2003/0079038 A1* | 4/2003 | Robbin et al. | 709/232 |
| 2003/0097379 A1 | 5/2003 | Ireton | |
| 2003/0162562 A1 | 8/2003 | Curtiss et al. | |
| 2003/0172209 A1 | 9/2003 | Liu et al. | |
| 2003/0220988 A1 | 11/2003 | Hymel | |
| 2003/0236075 A1 | 12/2003 | Johnson et al. | |
| 2004/0090998 A1 | 5/2004 | Chen | |
| 2004/0103223 A1 | 5/2004 | Gabehart et al. | |
| 2004/0162029 A1 | 8/2004 | Grady | |
| 2004/0186935 A1 | 9/2004 | Bel et al. | |
| 2004/0194154 A1 | 9/2004 | Meadors et al. | |
| 2004/0224638 A1* | 11/2004 | Fadell et al. | 455/66.1 |
| 2004/0249994 A1 | 12/2004 | Shapiro et al. | |
| 2005/0014531 A1 | 1/2005 | Findikli | |
| 2005/0014536 A1 | 1/2005 | Grady | |
| 2005/0017946 A1 | 1/2005 | Park | |
| 2005/0088275 A1 | 4/2005 | Valoteau et al. | |
| 2005/0111675 A1 | 5/2005 | Lee et al. | |
| 2005/0207726 A1 | 9/2005 | Chen | |
| 2005/0244025 A1* | 11/2005 | Schul et al. | 381/334 |
| 2006/0035527 A1 | 2/2006 | Numano | |
| 2006/0085351 A1 | 4/2006 | Hug | |
| 2006/0109987 A1 | 5/2006 | Baek | |
| 2006/0127034 A1* | 6/2006 | Brooking et al. | 386/46 |
| 2006/0156415 A1* | 7/2006 | Rubinstein et al. | 726/27 |
| 2006/0184456 A1 | 8/2006 | de Janasz | |
| 2006/0212637 A1* | 9/2006 | Lo et al. | 710/303 |
| 2006/0229090 A1* | 10/2006 | LaDue | 455/507 |
| 2007/0015457 A1 | 1/2007 | Krampf et al. | |
| 2007/0056013 A1 | 3/2007 | Duncan | |
| 2007/0070183 A1 | 3/2007 | Davis | |
| 2007/0080823 A1 | 4/2007 | Fu et al. | |
| 2007/0086724 A1* | 4/2007 | Grady et al. | 386/46 |
| 2007/0124804 A1 | 5/2007 | Burnham et al. | |
| 2007/0201705 A1* | 8/2007 | Dorogusker et al. | 381/104 |
| 2007/0206827 A1 | 9/2007 | Tupman et al. | |
| 2007/0233294 A1* | 10/2007 | Holden et al. | 700/94 |
| 2008/0075295 A1* | 3/2008 | Mayman et al. | 381/79 |
| 2008/0212971 A1* | 9/2008 | Shaanan et al. | 398/130 |
| 2008/0243282 A1 | 10/2008 | Koski | |
| 2009/0063744 A1 | 3/2009 | Krueger et al. | |

FOREIGN PATENT DOCUMENTS

| | | |
|---|---|---|
| EP | 1 104 150 A2 | 5/2001 |
| EP | 1 942 393 A1 | 7/2008 |
| JP | 0410258 A | 4/1992 |
| JP | 2000-287119 A | 10/2000 |
| JP | 2000-298537 A | 10/2000 |
| JP | 2002-221974 A | 8/2002 |
| JP | 2002-252566 A | 9/2002 |
| JP | 3090747 U | 10/2002 |
| JP | 2002-342659 A | 11/2002 |
| JP | 2002-374447 A | 12/2002 |
| JP | 2003-032351 A | 1/2003 |
| JP | 2003-274386 A | 9/2003 |
| JP | 2005-310287 A | 11/2005 |
| JP | 2005-323135 A | 11/2005 |
| JP | 2007-145325 A | 6/2007 |
| WO | WO 99/26330 A2 | 5/1999 |
| WO | WO 00/39907 A1 | 7/2000 |
| WO | WO 01/62004 A2 | 8/2001 |
| WO | WO 02/49314 A2 | 6/2002 |
| WO | WO 02/095555 A2 | 11/2002 |
| WO | WO 03/036541 A1 | 5/2003 |
| WO | WO 2004/098079 A1 | 11/2004 |
| WO | WO 2006/130784 A2 | 12/2006 |
| WO | WO 2007/069234 A2 | 6/2007 |
| WO | WO 2007/070543 A2 | 6/2007 |
| WO | WO 2007/139513 A1 | 12/2007 |

OTHER PUBLICATIONS

"Keyspan Express Remote," Product Fact Sheet, Oct. 2004, 1 page.
"Remote for iTunes; Controls iTunes, DVD, CD and more! (URM-15T)", product information datasheet, Keyspan, http://www.keyspan.com/products/usb/urm15t, downloaded Sep. 25, 2005, 2 pages.
"Neuros MP3 Digital Audio Computer," www.neurosaudio.com, downloaded Apr. 9, 2003.
"Sailing Clicker 2.2.1", User Manual, Copyright 2003-2005 Sailing Software AB, 45 pages.
Search Report from Chinese Patent No. ZL2008201310912, 4 pages.
International Search Report dated Nov. 6, 2008 from PCT/US2008/073473.
European Patent Application No. 1 0160463.5, European Search Report, 9 pages, Jun. 7, 2010.
U.S. Appl. No. 13/301,286, filed Nov. 21, 2011; Dorogusker, J., "Media System with Improved Interaction"; 40 pages.
"Altec Lansing inMotion," User's guide, 2003 Altec Lansing Technologies; 8 pages.
Belkin iPod Voice Recorder, Product Specification Sheet, printed Jun. 16, 2004.
"ipodDock/iPod Cradle," www.bookendzdocks.com/bookendz/dock_cradle.htm downloaded Feb. 27, 2003.
"DMR Software v1.3 for Mac OS X—User Manual", Copyright 2002, Keyspan, rev. 04.09.01A1, 50 pages.

* cited by examiner

SMART DOCK FOR CHAINING ACCESSORIES

CROSS-REFERENCES TO RELATED APPLICATIONS

This application is a divisional of U.S. patent application Ser. No. 12/193,246, filed Aug. 18, 2008, which claims the benefit of U.S. Provisional Patent Application 60/969,858 entitled "SMART DOCK FOR CHAINING ACCESSORIES," by Scott Krueger, filed Sep. 4, 2007, the entire contents of which are incorporated herein by reference.

BACKGROUND

The present invention relates generally to media players, and more particularly, to docking stations for daisy chaining accessories for the media players.

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

One popular function is the storage and output of content, such as music, images, photos, and movies. Improving compression methods like MPEG-standards, result in less storage capacity required making it more convenient to store tens of thousands of songs and photos, and several full-length DVD quality movies. Moreover, distribution via the Internet makes it easier to obtain multimedia content.

Several accessories are available for use in connection with portable electronic devices, such as the iPod®. In the case of an MP3 player (or, for that matter, any other digital media playback device), a number of digitized audio files are stored in a storage medium included in or coupled to the MP3 player in a fashion deemed most suitable to the user. In order to provide improved listening experiences, a number of portable accessories can be connected to the MP3 player for broadcasting of played digital music files to more than a single person. Additionally, in the case of a portable movie player, a number of portable accessories can be connected to the movie player for broadcasting of played digital movie files on standard or high-definition screens.

Accordingly, what is desired are improved methods and apparatus for using the portable electronic devices discussed above. Additionally, what is desired are improved methods and apparatus for reducing some of the drawbacks in the use of portable electronic devices.

BRIEF SUMMARY

Embodiments of the present invention provide apparatus, systems and methods for communicating between an accessory and an electronic device. In one embodiment, a first interface is configured to communicate with the electronic device. A second interface is configured to communicate with the accessory. A set of preferences is received from the accessory and forwarded to the electronic device.

According to one exemplary embodiment, a docking station for communicating between an accessory and an electronic device includes a first interface, a second interface, and a processor. The first interface is configured to communicate with the electronic device. The second interface is configured to communicate with the accessory. The processor is coupled to the first interface and the second interface. The processor is configured to receive a set of preferences from the accessory and forward the set of preferences to the electronic device.

The docking station may also receive information from the electronic device in response to the set of preference and forward the information to the accessory. In one embodiment, the docking station is configured to interact with the accessory to determine the set of preferences. In another embodiment, the docking station authenticates the electronic device.

In one embodiment, the docking station may interact with the electronic device to modify output of one or more signals associated with the electronic device. For example, the docking station may modify a volume setting. In one aspect, the docking station may modify the volume setting based on a stored volume setting. As another example, the docking station may modify a video setting. In one aspect, the video setting may include at least one of an upsampling setting, a downsampling setting, a format setting, a timing setting, and a video effect setting. In some embodiments, the docking station may interact with the electronic device to initiate an echo cancellation program.

According to another exemplary embodiment, a method for communicating between an accessory and an electronic device is provided. The presence of the accessory is detected at a docking station that couples the accessory to the electronic device. The docking station receives a set of preferences associated with the accessory and enables one or more functionalities associated with the electronic device based on the set of preferences. In some embodiments, the docking station is authenticated by the electronic device.

In one embodiment, a request may be generated at the docking station for the set of preferences. The set of preferences may be received at the docking station in response to the request. In another embodiment, information may be received from the electronic device at the docking station in response to the set of preference. The information then may be delivered to the accessory. In one embodiment, one or more signals, which are associated with the electronic device, are modified before being transmitted from an output of the docking station.

According to another exemplary embodiment, an electronic device holder suitable for holding an electronic device and for managing an accessory used to connect the electronic device to an external electrical system includes a first interface, a second interface, and base component. The first interface is configured to receive the electronic device. The second interface is configured to receive the accessory. The base component includes circuitry configured to communicate with the accessory through the second interface to determine a set of preferences and to communicate with the electronic device through the first interface to deliver the set of preferences.

In one embodiment, the electronic device holder includes a wireless communications interface configured to receive information indicative of one or one functionalities associated with the electronic device. The electronic device holder may include authentication circuitry configured to authenticate to the electronic device.

In various embodiments, the electronic device holder includes a third interface configured to output an audio signal. Audio control circuitry may be configured to control output of one or more signals from the electronic device through the third interface. The electronic device holder may include control circuitry configured to interact with the electronic device to initiate one or more functionalities associated with the electronic device.

According to another exemplary embodiment, a dock system includes a first interface, a second interface, and a base component. The first interface is configured to receive a first electronic device. The second interface is configured to receive a second electronic device. The base component couples the first interface and the second interface. The base component is configured to selectively enable and disable a line out signal associated with the first device based the presence of the second electronic device at the second interface.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

In order to better understand the present invention, aspects of the environment within which various embodiments operate will first be described.

Figure 1:
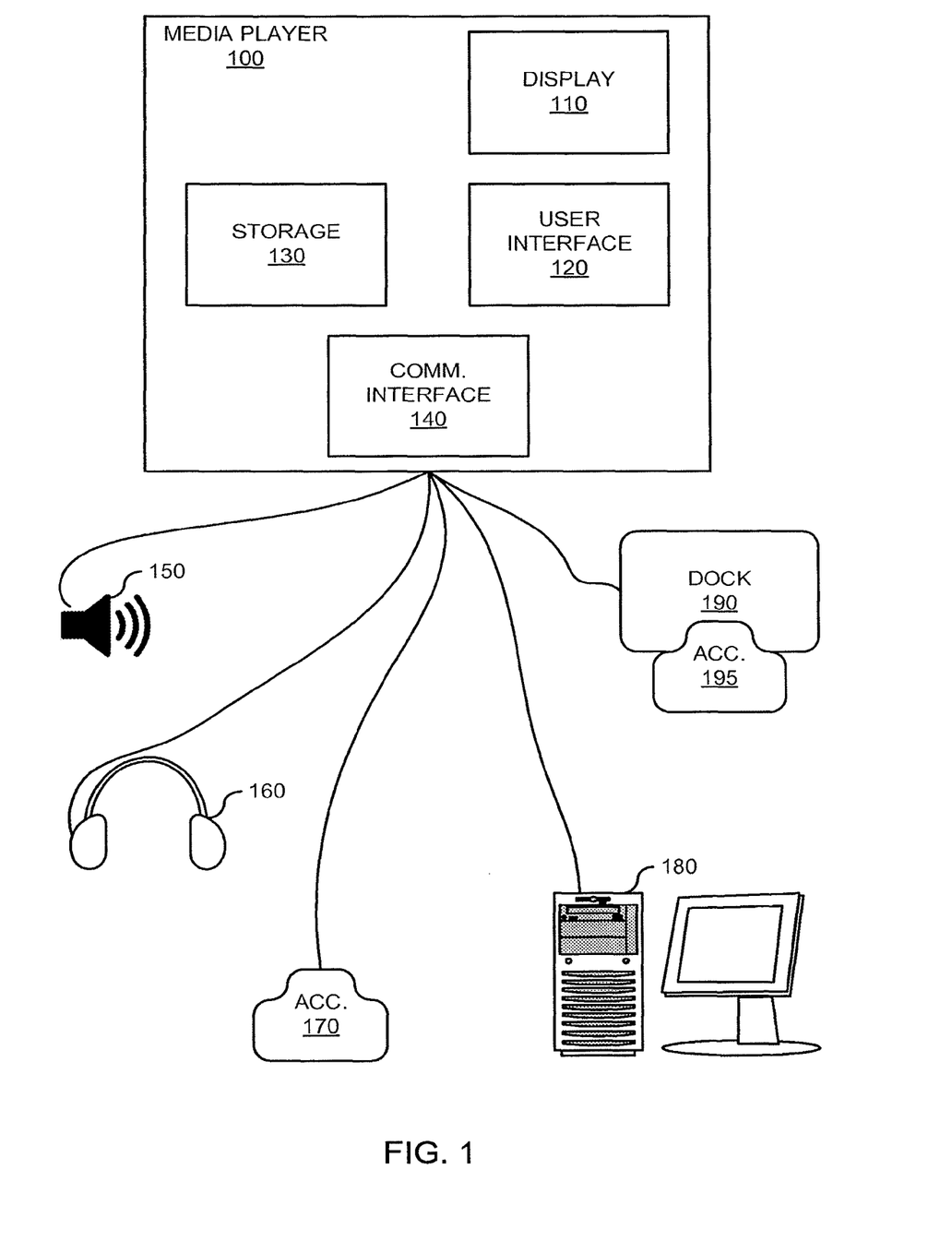
FIG. 1 is a block diagram of a media player that may incorporate embodiments of the present invention.

FIG. 1 is a block diagram of a media player 100 that may incorporate embodiments of the present invention. In general, a media player stores content and/or media assets, such as audio tracks, movies, or photos that can be played or displayed on the media player. One example of a media player is the iPod® media player, which is available from Apple Inc. of Cupertino, Calif. Another example of a media player is a personal computer, such as a laptop or desktop.

In this example, media player 100 includes display 110, user interface 120, storage 130, and communications interface 140. Media play 100 may display information associated with content, such as track information and album art, and the content itself, such as a photo or movie using display 110. A user may interact with user interface 120 of media player 100 to view or consume content stored with storage 130. Storage 130 may be any read only memory (ROM), random access memory (RAM), non-volatile memory, flash memory, floppy disk, hard disk, and the like. Communications interface 150 may include universal serial bus (USB) interfaces, IEEE 1394 (or FireWire/iLink®) interfaces, wired and wireless network interfaces, and the like.

Media player 100 typically includes one or more connectors or ports (e.g., communications interface 140) that can be used to interface to media player 100. For example, a connector or port can enable media player 100 to output audio to speakers 150 ad/or output audio to headphones 160. In another example, a connector or port can enable media player to interface to an accessory 170, a host computer 180, or be inserted into a docking system 190.

Docking system 190 may further enable one or more accessory devices 195 to interface with media player 100. There are today many different types of accessory devices 170 and 195 that can interconnect to media player 100. For example, a remote control can be connected to the connector or port to allow the user to remotely control media player 100. As another example, an automobile can include a connector. The media player 100 can then be inserted onto the connector or dock such that an automobile media system can interact with media player 100, thereby allowing the media content on the media player to be played within the automobile, e.g. through the speakers of the automobile.

Often, media player 100 receive content or other media assets from a host computer (e.g., host computer 160) that serves to enable a user to manage media assets. As an example, media player 100 interface 130 allows media player 100 to interface with host computer 160 that executes a media management application to manage media assets. One example of a media management application is iTunes®, produced by Apple Inc. of Cupertino, Calif. Media player 100 may further be connected to private and public communication networks, such as the Internet.

Smart Dock

Figure 2:
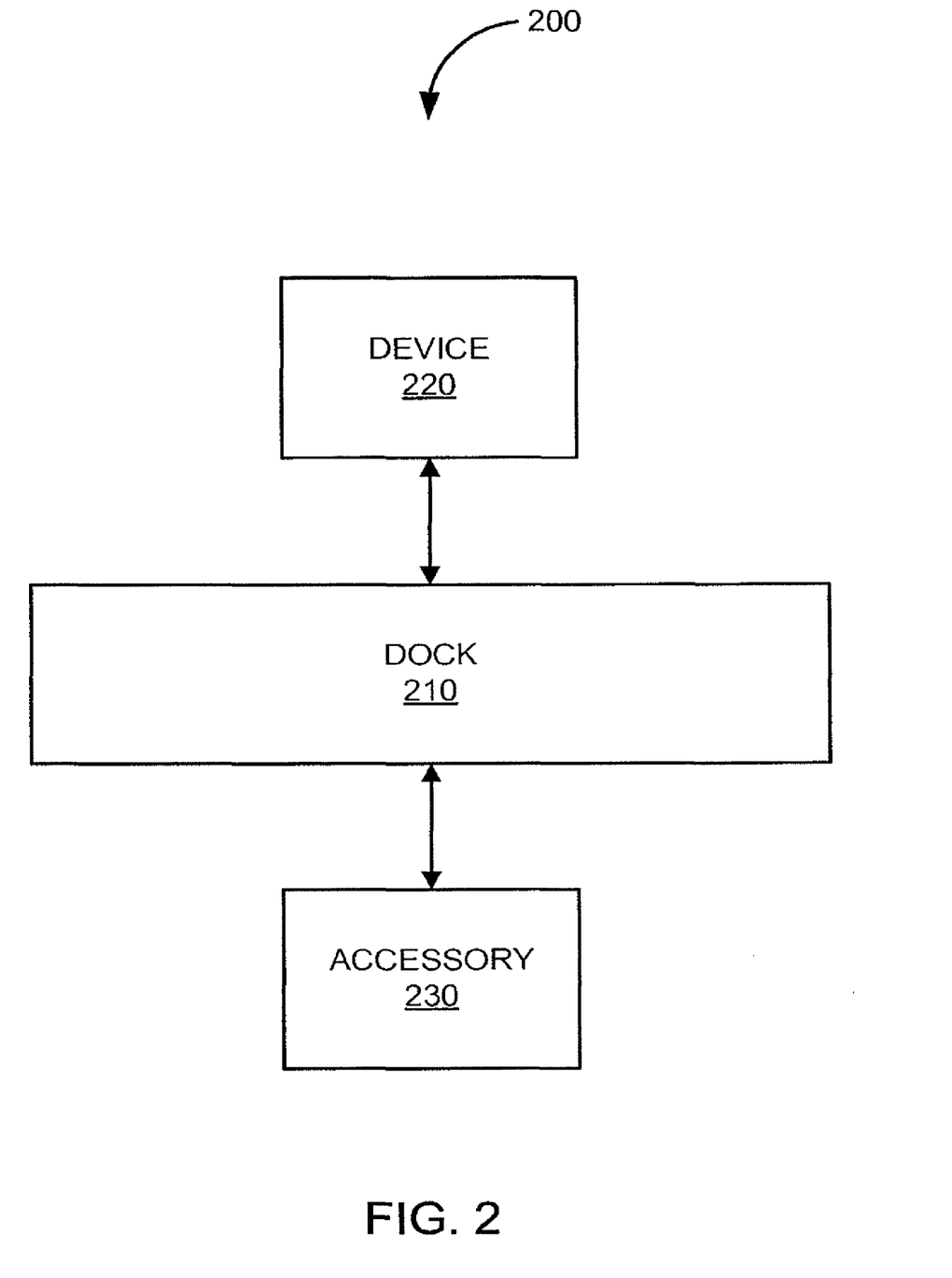
FIG. 2 is a system for daisy chaining accessories in one embodiment according to the present invention.

FIG. 2 is a system 200 for daisy chaining accessories in one embodiment according to the present invention. In this example, system 200 includes a docking station (or dock) 210, a device 220, and an accessory 230.

In general, dock 210 is any hardware and/or software elements that provide an interface between device 220 and accessory 230. In some embodiments, dock 210 may include at least one speaker. The speakers may include a pair of midrange speakers and a subwoofer speaker. Dock 210 may also include volume control devices. In one embodiment, the volume control devices are buttons. Still further, dock 210 may include one or more indicator lights that provide visual feedback to a user regarding the operation or condition of dock 210, device 220, and/or accessory 230. In some embodiments, dock 210 may include at least one display.

Typically, device 220 is suitable for use as media player 110 shown in FIG. 1. Device 220 may include a processor that pertains to a microprocessor or controller for controlling the overall operation of device 220. Device 220 may store media data pertaining to media assets in a file system and/or a cache. The file system is, typically, a storage disk or a plurality of disks, flash memory, and the like. The file system may provide high capacity storage capability for device 220. The cache may be, for example, Random-Access Memory (RAM) provided by semiconductor memory. Device 220 may further include RAM and/or ROM that can store programs, utilities or processes to be executed in a non-volatile manner.

In some embodiments, device 220 includes a user input device that allows a user of device 220 to interact with device 220. The user input device may take a variety of forms, such as a button, keypad, dial, etc. Still further, device 220 may include a display (e.g., a screen display) to display information to the user. Device 220 may also includes a bus interface that couples to a data link. The data link may allow device 220 to couple to a host computer over a wired or wireless connection.

Accessory 230 may be any device, cable, attachment, and the like that may be coupled to device 220. Some examples of accessory 230 are speakers, headphones, audio input/output cables, video input/output cables, FM/TV tuners/receivers/broadcasters, voice recorders, USB cables, FireWire cables, and the like.

In one example of operation, dock 210 provides communication between device 220 and accessory 230. In general, dock 210 permits daisy chaining of accessories (e.g., accessory 230) that may be connected to the dock to device 220. Dock 210 may be linked physically to device 220 and accessory 230. Alternatively, dock 210 may be wirelessly linked to either or both of device 220 and accessory 230. Accessory 230 further may be physically integrated into dock 220.

Figure 3A:
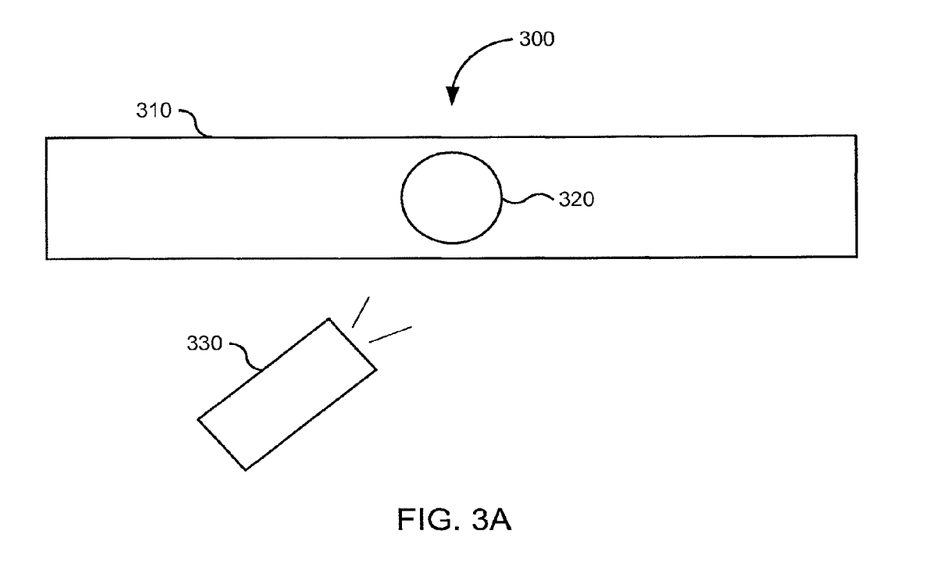
FIG. 3A is a block diagram illustrating a front view of a docking station in one embodiment according to the present invention.

FIG. 3A is a block diagram illustrating a front view of a docking station 300 in one embodiment according to the present invention. In this example, docking station 300 includes a base 310, communications port 320, and a remote controller 330.

Communications port 320 may be used by a receiver internal to base 310 when picking-up wireless transmissions from a remote controller 330. Remote controller 330 may include a plurality of user input controls (not shown). It should be noted that remote controller 330 could transmit any of a number of signals such as infrared, radio frequency (RF), audio signals, and the like. Through use of the user input controls on remote controller 330, the user is able to indirectly interact with a device attached to docking station 300 (e.g., media player 100 of FIG. or device 220 of FIG. 2) or directly interact with the docking station 300.

For example, a user of remote controller 330 can interact with the user input controls to select a media item to be played on a portable media player. Remote controller 330 can also be used to alter the volume of the audio output.

Figure 3B:
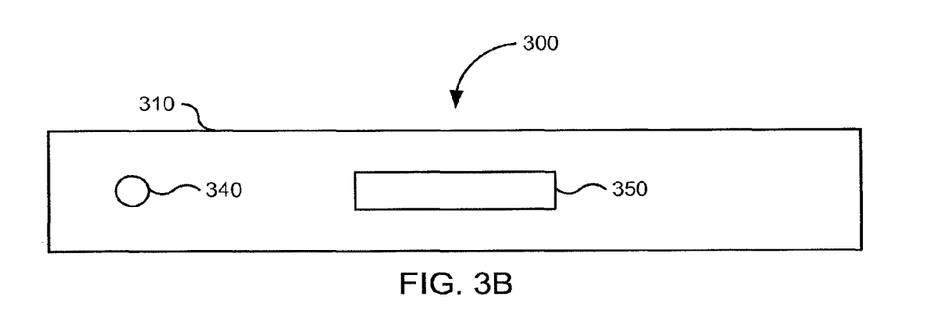
FIG. 3B is a block diagram illustrating a rear view of a docking station in one embodiment according to the present invention.

FIG. 3B is a block diagram illustrating a rear view of docking station 300 in one embodiment according to the present invention. In this example, docking station 300 includes an audio output jack 340 and an interface 350.

Docking station 300 may allow audio to be provided through audio output jack 340. In one example, interface 350 includes a 30 pin connector. Video signals (e.g., component, composite, s-video) may be routed through the 30-pin connector. Audio may also be routed out of the 30-pin connector. The audio volume coming out of the audio jack and the 30-pin connector can be adjusted—that is adjusted based on the UI setting for the volume to be output through audio output jack 340 or interface 350 (e.g., the 30-pin connector).

Figure 3C:
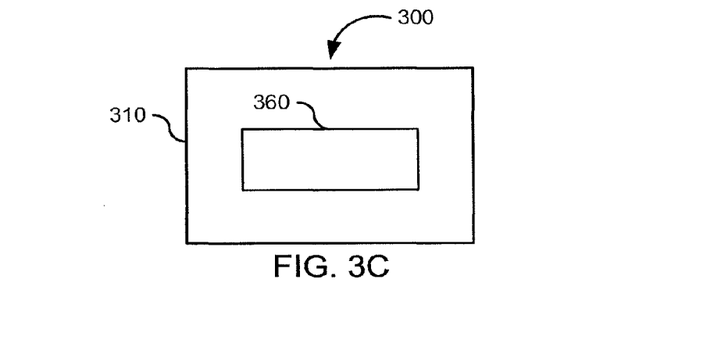
FIG. 3C is a block diagram illustrating is a top view of a docking station in one embodiment according to the present invention.

FIG. 3C is a block diagram illustrating is a top view of docking station 300 in one embodiment according to the present invention. In this example, docking station 300 includes base 310 and interface 360. Typically, an electronic device is coupled to interface 360 and one or more accessories are coupled to interface 350.

In some embodiments, docking station 300 includes hardware and/or software elements configured to remember the volume setting for when an accessory (e.g., a smart video cable, or a speaker system) is plugged into docking station 300. Docking station 300 can remember the volume setting for audio output jack 340 and/or interface 350. In one embodiment, the remembered volume setting is for any accessory using the connection. In another embodiment, the remembered volume setting is for a particular accessory using that particular connection. The identification of a particular volume setting may be communicated through the same or similar process as for receiving the preferences. The volume setting for each accessory that has been connected may be stored in the dock.

In one embodiment, the line-out signal from the electronic device is attenuated or amplified locally in the dock, thereby providing a volume control. In another embodiment, the dock can send a signal to the electronic device to have a volume setting of the electronic device changed.

In some embodiments, docking station 300 includes hardware and/or software elements configured to enable/disable one or more features an electronic device coupled to docking station 300.

Traditionally, media players have always kept their audio line out open. However, this is no longer the case. For example, smart phones and other devices that have a speaker, which may not want the audio line out open. In one embodiment, docking station 300 may instruct a electronic device, such as an iPod®/iPhone®, to turn ON/OFF its line out. In another embodiment, docking station 300 may not instruct an electronic device to turn its line out ON unless an audio conducting accessory is attached to either audio output jack 340 or interface 350 (e.g., the 30-pin connector). For example, if a simple charging cable is connected to the 30-pin connector interface 350, docking station 300 may not activate the line out feature of an electronic device. However, if a speaker system is hooked up to either audio output jack 340 or interface 350, docking station 300 may set the volume based on the last volume setting, and then instruct the electronic device to turn ON its line out.

In another embodiment, docking station 300 may instruct an electronic device to enable/disable an echo cancellation program. As one example, an echo cancellation program uses active software algorithms to remove echo's from speakerphone conversations. Docking station 300 may include identification information which may be provided to the electronic device so that the electronic device can initiate the appropriate echo cancellation program (e.g., the program for a particular model, version, and the like of docking station 300).

For example, the audio behavior and inherent echo patterns are vastly different when the phone is sitting in a dock (because the speaker is down on the bottom, and thus "inside" of the dock). Thus, a particular echo cancellation program may be needed for a particular dock, which announces itself as possibly requiring those unique parameters for the echo cancellation program.

In various embodiments, docking station 300 includes authentication circuitry to identify, validate, and/or authenticate an electronic device (e.g., an iPod®) that may be attached to docking station 300. In one aspect, the authentication is a process by which an accessory proves to an electronic device that it is a genuine approved accessory. In one embodiment, the authentication is done using public/private key cryptography. The accessory can be the dock or the accessory connected to the dock. In another aspect, an authentication process proves to the accessory that the electronic device is a genuine approved electronic device.

In one embodiment, when an accessory is connected to docking station 300 using interface 350, docking station 300 communicates with the accessory and asks the accessory if it has any preferences. If the accessory does have preferences, docking station 300 may forward the preferences to an attached electronic device, such as an iPod® or iPhone®. The electronic device may provide data to the accessory through docking station 300 in response to receiving the preferences from docking station 300. In essence, docking station 300 serves as a "preference proxy" or preference go-between between the accessory and the electronic device.

Figure 4:
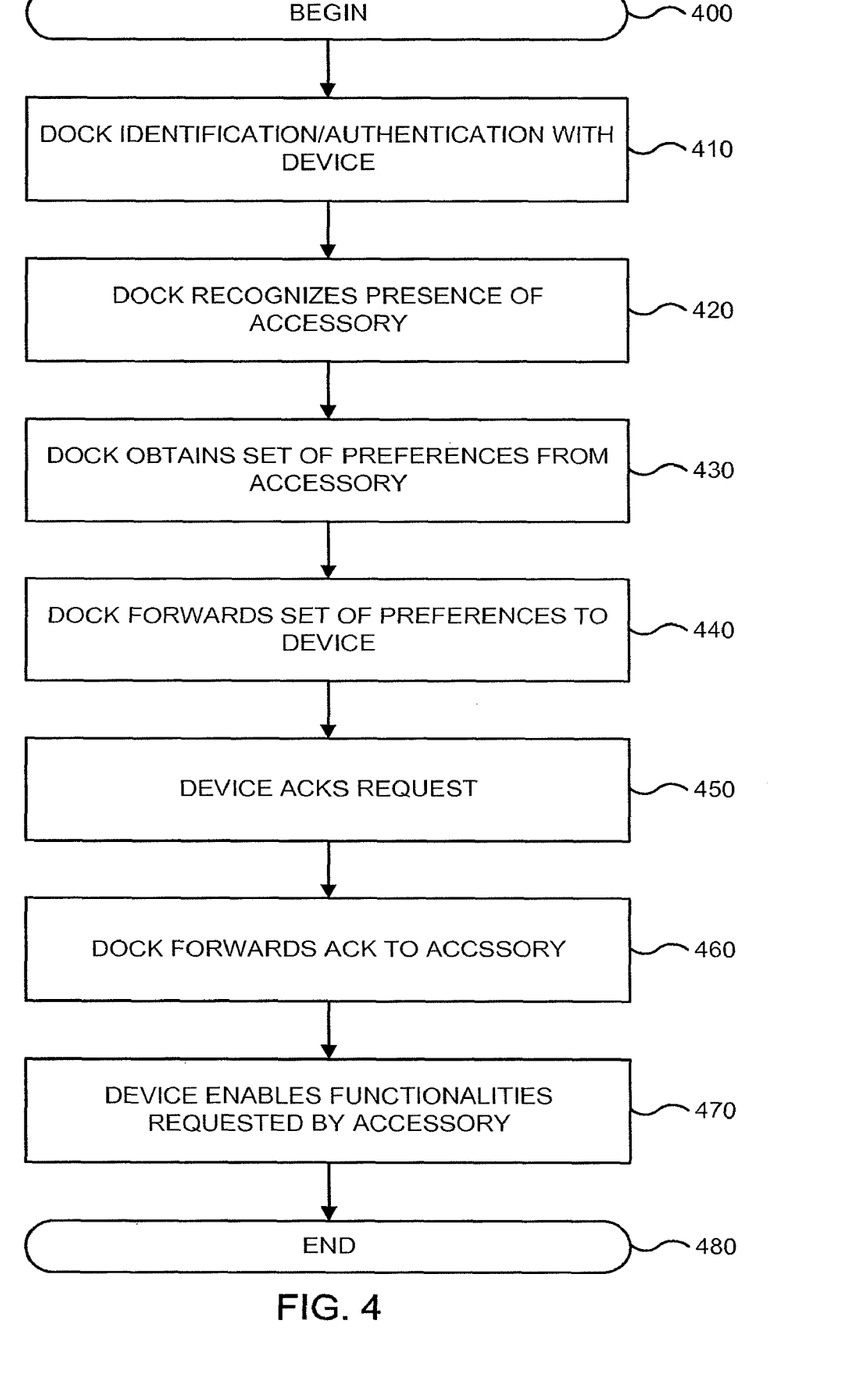
FIG. 4 is a flowchart illustrating interactions between a docking station and an accessory in one embodiment according to the present invention.

FIG. 4 is a flowchart illustrating interactions between a docking station (e.g., docking station 300) and an accessory in one embodiment according to the present invention. The processing depicted in FIG. 4 may be performed by software modules (e.g., instructions or code) executed by a processor of a computer system, by hardware modules of the computer system, or combinations thereof. FIG. 4 begins in step 400.

In step 410, docking station 300 performs identification and/or an authentication with an electronic device (e.g. media player 100). In one embodiment, the identification allows advanced features to be used. Docking station 300 may use one or more protocols, such as an accessory protocol to perform identification and/or authentication. One example of such a protocol is the iPod Accessory Protocol (iAP) provided by Apple Inc. of Cupertino, Calif.

In step 420, docking station 300 recognizes the presence of an accessory. In step 430, docking station 300 obtains a set of preferences from the accessory. The set of preferences may include information indicative of services or features available, commands, requests for services or features available, and the like.

In one example, the accessory automatically broadcasts a message containing the set of preferences which is intercepted by docking station 300. In another example, upon recognition of the accessory, the accessory attempts to authenticate itself with the docking station 300 according to one or more authentication protocols. After authentication, docking station 300 may generate and transmit to the accessory a message indicative of a request for a set of preferences. In one embodiment, the authentication is required for the request to be sent.

In step 440, docking station 300 receives a set of preferences and forwards the set of preferences to media player 100. In step 450, media player 100 acknowledges the set of preferences (e.g. acknowledging a request for one or more services). In step 460, docking station 300 forwards the acknowledgment to the accessory.

In step 470, media player 100 enables settings requested by the accessory. For example, an A/V cable accessory attached to docking station 300 may request that media player 100 enable the output of audio/visual information according to a predetermined scheme. Accordingly, media player 100 may enable the output of audio/visual information on one or more pins coupled to interface 360. The information then may be routed via interface 350 to the accessory. FIG. 4 ends in step 480.

Figure 5:
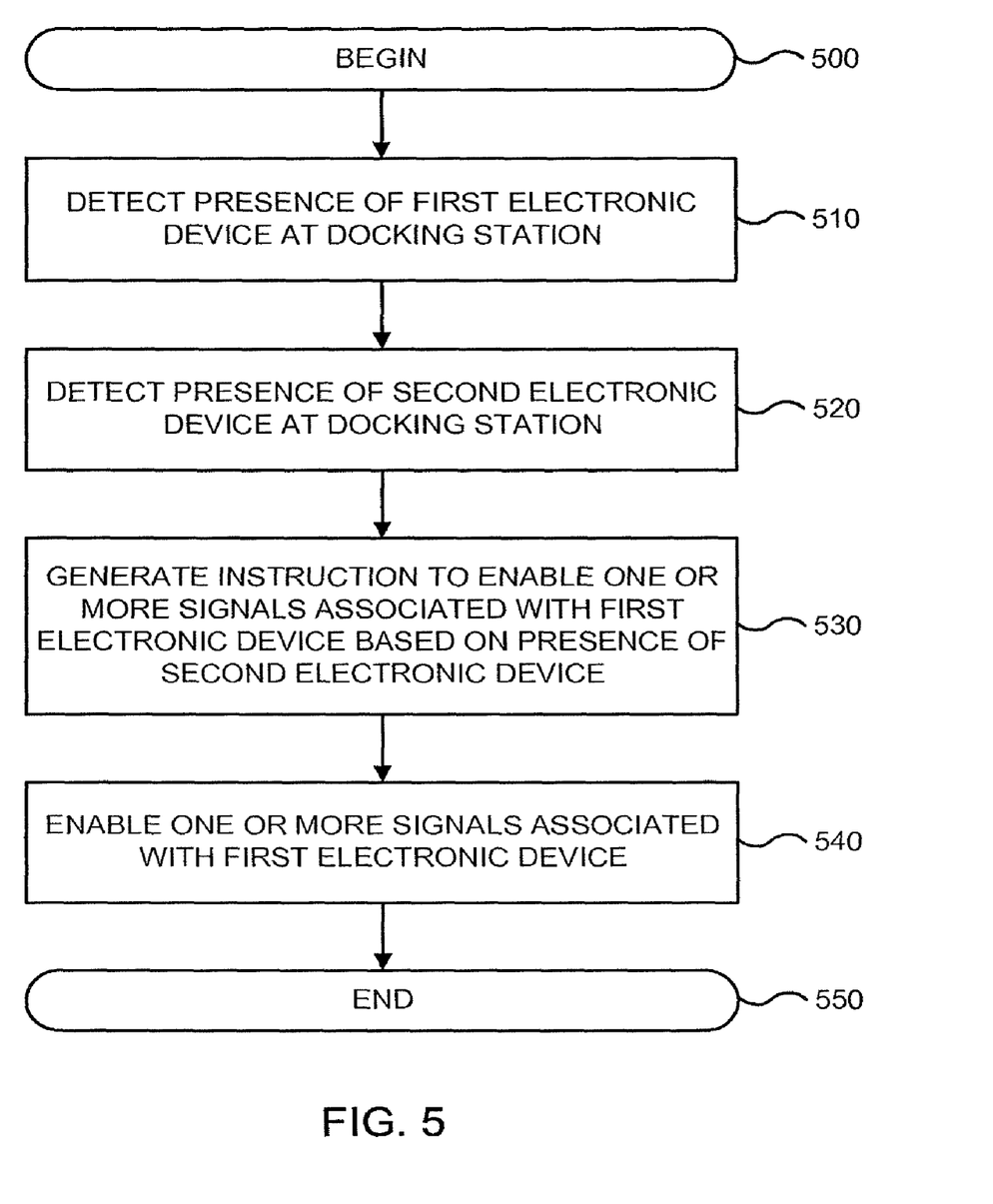
FIG. 5 is a flowchart of a method for enabling one or more signal associated with a first electronic device based on the presence of a second electronic device at a docking station in one embodiment according to the present invention.

FIG. 5 is a flowchart of a method for enabling one or more signals associated with a first electronic device based on the presence of a second electronic device at a docking station in one embodiment according to the present invention. FIG. 5 begins in step 500.

In step 510, presence of a first electronic device is detected at a docking station. For example, the presence of media player 100 may be detected at a 30-pin interface associated with docking station 300.

In step 520, presence of a second electronic device is detected at a docking station. For example, the presence of an accessory, such as a cable, is detected at a 30-pin interface associated with docking station 300.

In step 530, an instruction is generated to enable one or more signals associated with the first electronic device based on the presence of the second electronic device. In one example, docking station 300 instructs media player 100 to enable its line out when a cable accessory is detected at docking station 300. In another example, docking station 300 may instruct media player 100 to enable video signals, upsampling settings, downsampling settings, format modifications, timing changes, and other audio/video effects.

In step 540, the one or more signals associated with the first electronic device are enabled. For example, media player 100 may enable/disable line out, video output, audio/video format or signal type (e.g., analog/digital), control signals, timing signals, and the like. Other functionalities and settings associated with media player 100 may also be modified (e.g., enabled/disable) by docking station 300. FIG. 5 ends in step 600.

Figure 6:
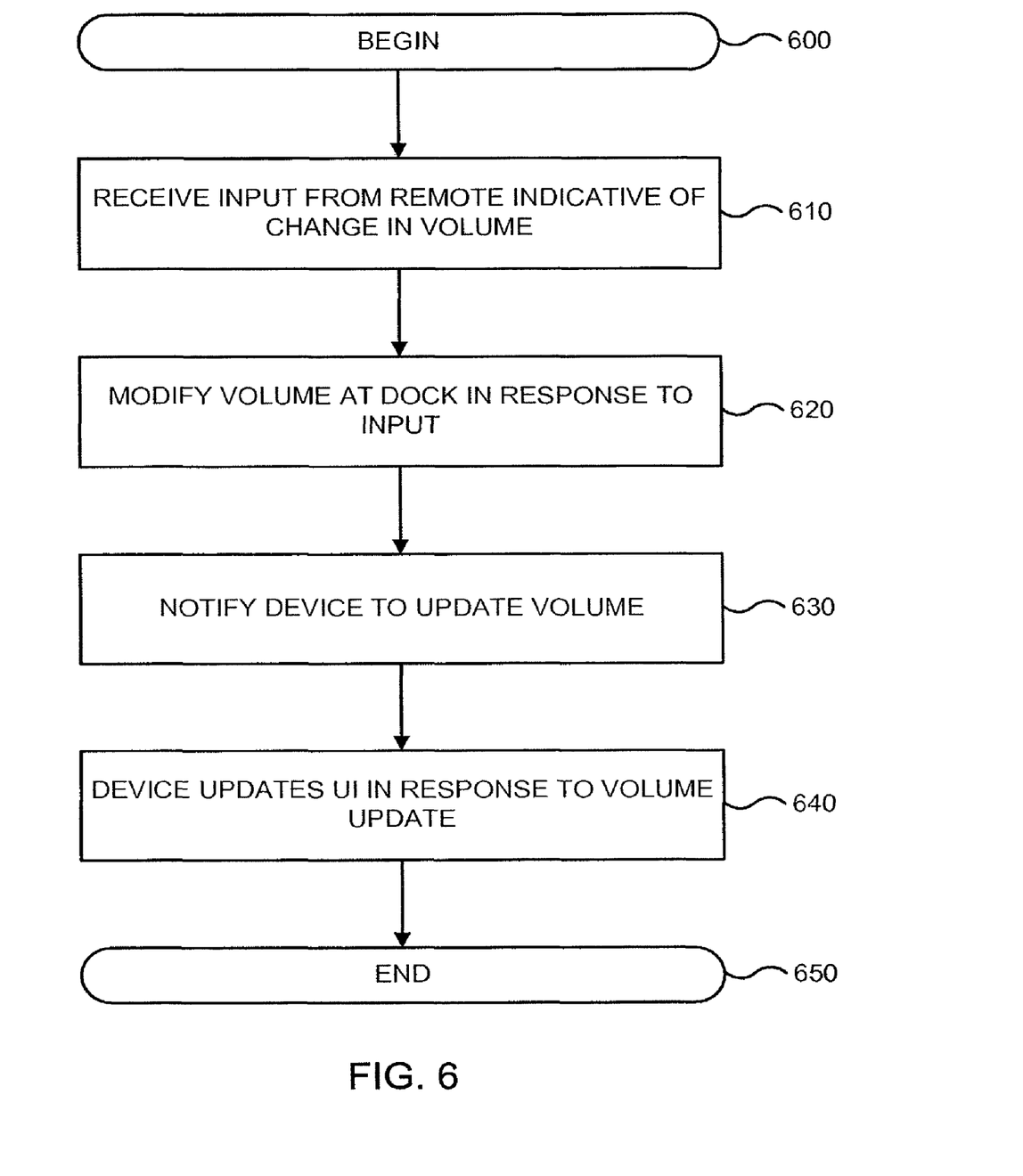
FIG. 6 is a flowchart of a method for modifying a volume signal using a docking station in one embodiment according to the present invention.

FIG. 6 is a flowchart of a method for modifying a volume signal using docking station 300 in one embodiment according to the present invention. FIG. 6 begins in step 600.

In step 610, input is received from a remote controller (e.g. remote controller 330 associated with docking station 300) indicative of a change in volume. In step 620, docking station 300 modifies the volume in response to the input. In one embodiment, the volume is modified by an electrical attenuation applied to the audio signal coming from the electronic device.

In step 630, docking station 300 notifies an electronic device attached to docking station 300 to update the volume. In one example, docking station 300 generates a signal indicative of the change in volume. In another example, docking station 300 generates a message indicative of the change in volume. In one aspect, a volume level displayed on the device UI is changed based on the notification.

In step 640, the electronic device updates a user interface in response to the volume update. For example, media player 100 may update visual information displayed to the user to reflect the change in volume. FIG. 6 ends in step 650.

Figure 7:
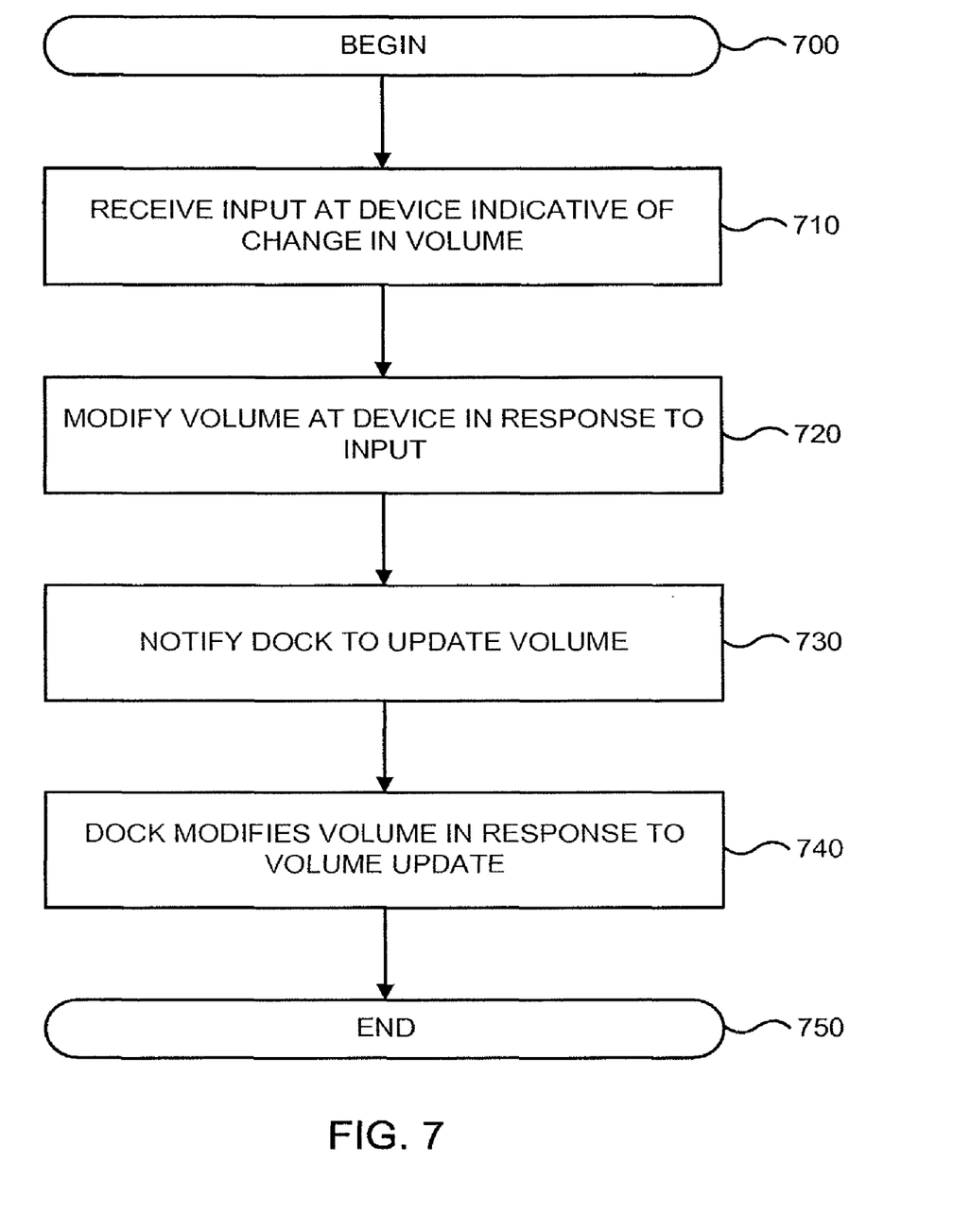
FIG. 7 is a flowchart of a method for modifying a volume signal using a portable electronic device coupled to a docking station in one embodiment according to the present invention.

FIG. 7 is a flowchart of a method for modifying a volume signal using a portable electronic device coupled to docking station 300 in one embodiment according to the present invention. FIG. 7 begins in step 700.

In step 710, input is received at the electronic device indicative of a change in volume. In step 720, the volume at the device is modified in response to the input. In step 730, docking station 300 is notified to update the volume. In one example, docking station 300 monitors one or more signals provided by the electronic device indicative of a volume level. In another example, docking station 300 receives a message generated by the electronic device indicative of a change in volume.

In step 740, docking station 300 modifies the volume in response to the volume update. For example, docking station 300 may adjust the level or signal strength of audio output jack 340. In another example, docking station 300 may adjust the level or signal strength of audio information being output using interface 350. FIG. 7 ends in step 750.

Figure 8:
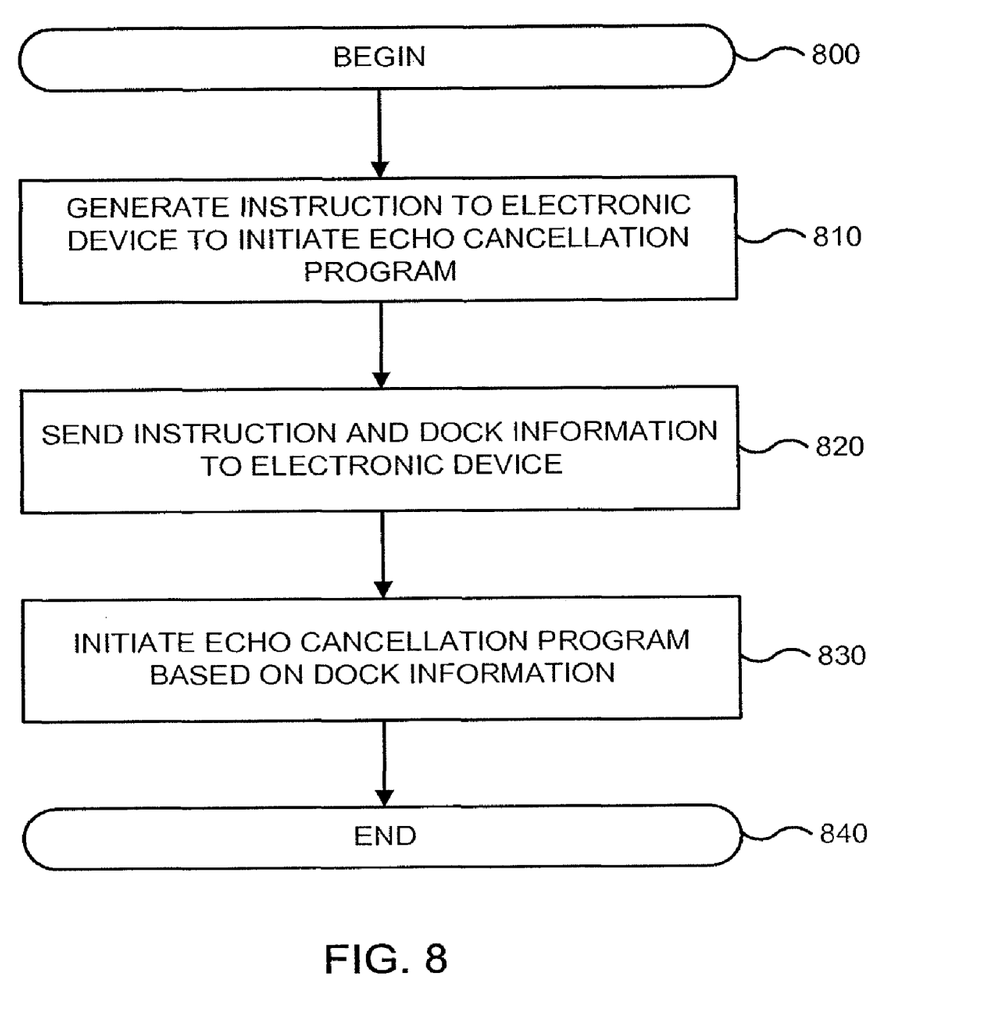
FIG. 8 is a flowchart of a method for initiating echo cancellation using docking station 300 in one embodiment according to the present invention.

FIG. 8 is a flowchart of a method for initiating echo cancellation using docking station 300 in one embodiment according to the present invention. FIG. 8 begins in step 800.

In step 810, docking station 300 generates one or more instructions to media player 100 to initiate an echo cancellation program. The one or more instructions may be any signal, message, and the like, instructing media player 100 to initiate an echo cancellation program. In step 820, docking station 300 sends the instruction and dock information to electronic device. The dock information may be an identifier, serial number, model number, and the like, that may be used to identify docking station 300 and/or software, firmware, or hardware elements associated with docking station 300. In one embodiment, the accessory connected to the dock could be identified in a same or similar manner.

In step 830, media player 100 initiates an echo cancellation program based on the dock information. For example, media player 100 may determine a particular echo cancellation routine to be executed based on an identifier associated with docking station 300. In another example, media player 100 may select between one or more echo cancellation routines or programs based on information from docking station 300.

Thus, docking station 300 may instruct an electronic device to enable/disable an echo cancellation program. Docking station 300 may include identification information which may be provided to the electronic device so that the electronic device can initiate the appropriate echo cancellation program (e.g., the program for a particular model, version, and the like, of docking station 300). FIG. 8 ends in step 840.

Figure 9A:
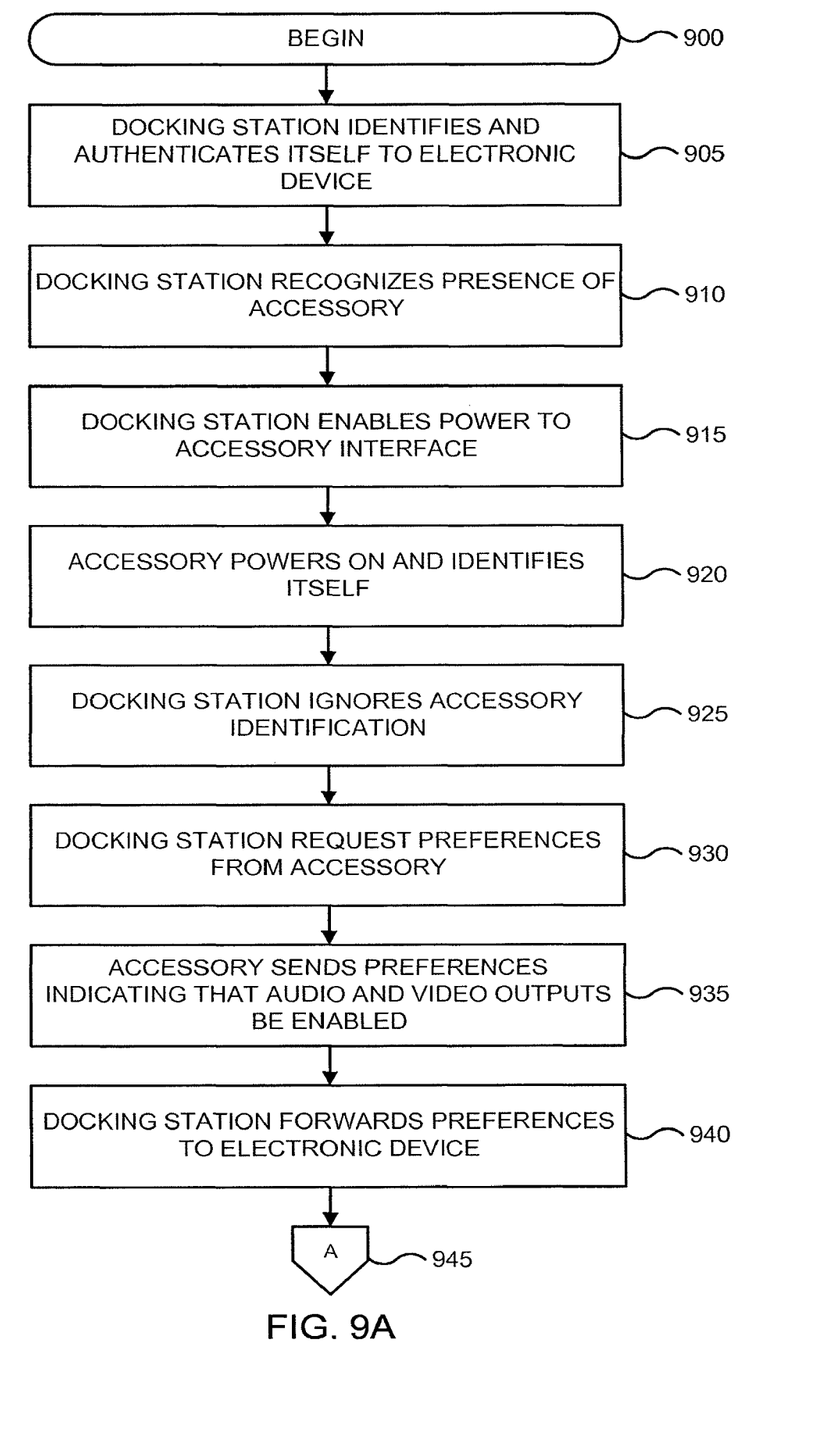
FIGS. 9A and 9B are a flowchart illustrating interactions between an electronic device, a docking station, and an accessory in one embodiment according to the present invention.
Figure 9B:
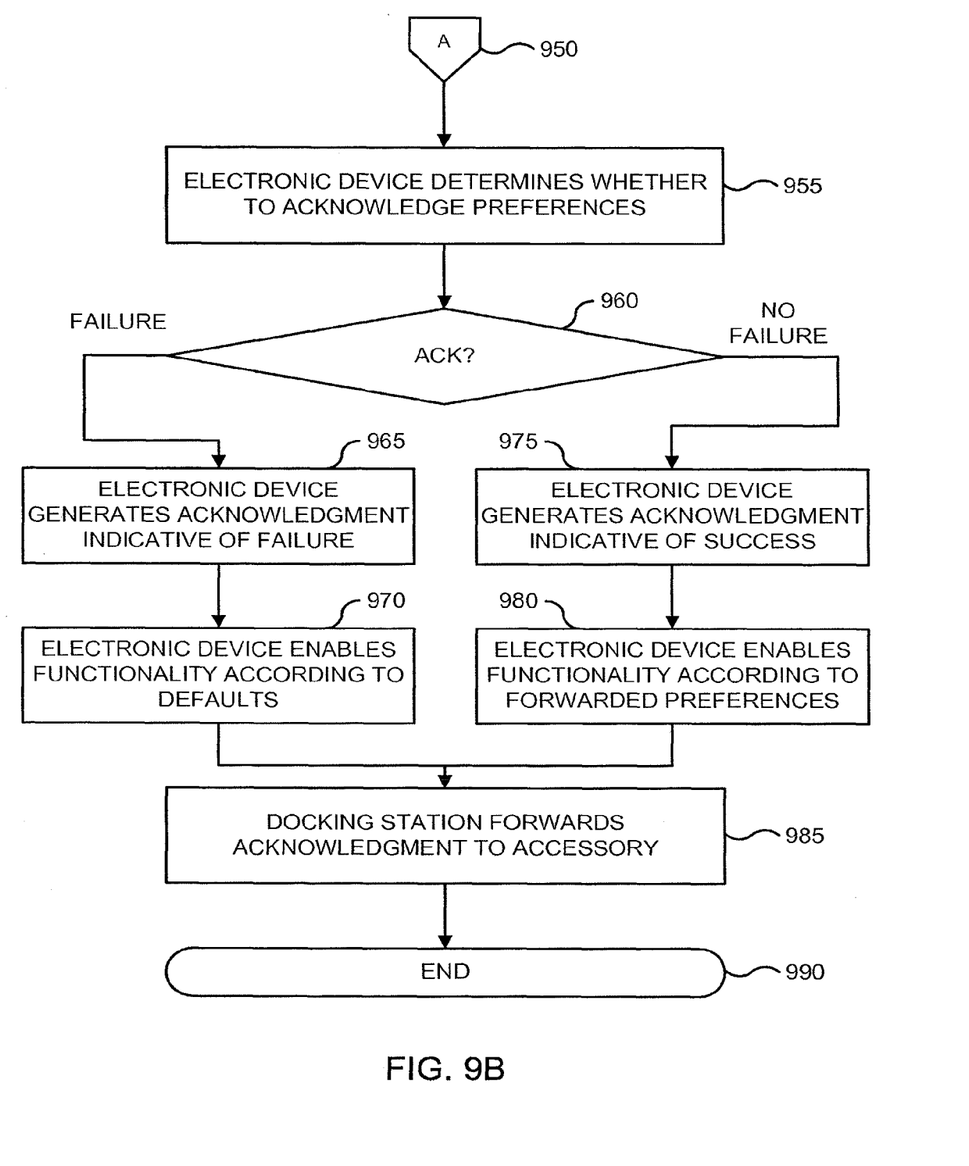

FIGS. 9A and 9B are a flowchart illustrating interactions between an electronic device, a docking station, and an accessory in one embodiment according to the present invention. The following sequence illustrates an example of the events when connecting an accessory to docking station 300. Hence, the present descriptions and drawings should not be considered in a limiting sense, as it is understood that the present invention is in no way limited to only the embodiments illustrated.

In this example, an A/V cable is attached to docking station 300 hosting an iPod® media player. All video lines are passed directly from media player 100 (e.g., via an iPod® 30-pin connector) through docking station 300 to the A/V cable. In order to properly enable the correct audio and video functionality, two separate iAP conversations may occur: one between the A/V cable and docking station 300, and one between docking station 300 and media player 100. FIG. 9A begins in step 900.

In step 905, docking station 300 identifies and authenticates itself to an electronic device (e.g., media player 100). In one example, after authentication, docking station 300 requests line-out audio from media player 100. Media player 100 then may supply audio to a 30-pin connector with which it interfaces with docking station 300.

In step 910, docking station 300 recognizes the presence of an accessory (e.g., the A/V cable). For example, docking station 300 may recognize the presence of an accessory attached to an accessory interface that has pulled a predetermined signal to ground. This signal may be called an "Accessory Detect."

In step 915, upon successful authentication to media player 100, docking station 300 enables power to the accessory interface. For example, docking station 300 may enable power to a 30-pin connector with which it interfaces with accessories. In step 920, the A/V cable powers on and identifies itself. In one example, the A/V cable powers on an identifies itself via one or more commands associated with an accessory protocol, such as iAP.

In various embodiments, docking station 300 may authenticate with the accessory according to one or more accessory protocols. The authentication may be performed in either direction. In this example, in step 925, docking station 300 does not respond to commands sent from the A/V cable in an attempt to authenticate with an electronic device. Nevertheless, in step 930, docking station 300 proceeds to request preferences from the accessory. For example, docking station 300 may send one or more commands associated with an accessory protocol, thereby instructing the A/V cable to issue any preferences it desires.

In step 935, the A/V cable sends preferences indicating that audio and video outputs be enabled. For example, the A/V cable may request that audio and video output be enabled via one or more commands associated with the accessory protocol. The A/V cable may further specify the desired video output type (i.e., component and composite, respectively).

In step 940, docking station 300 forwards the preferences to the electronic device. In one example, docking station 300 forwards a series of one or more commands to media player 100. FIG. 9A ends in step 945.

FIG. 9B begins in step 950. In step 955, media player 100 determines whether to acknowledge the preferences. In step 960, if media player 100 was not able to enable functionality according to the requested preferences, in step 965, media player 100 generates an acknowledgment indicative of failure. In step 970, media player 100 enables functionality according to one or more predetermined defaults.

Returning to step 960, if media player 100 was able to enable functionality according to the request at preferences, in step 975, media player 100 generates an acknowledgment indicative of success. In step 980, media player 100 enables functionality according to the requested preferences. For example, media player 100 may enable output of content in a manner requested by the accessory and in a format requested by the accessory.

In step 985, docking station 300 forwards any acknowledgments received from media player 100 to the A/V cable accessory. FIG. 9B ends in step 990.

Figure 10:
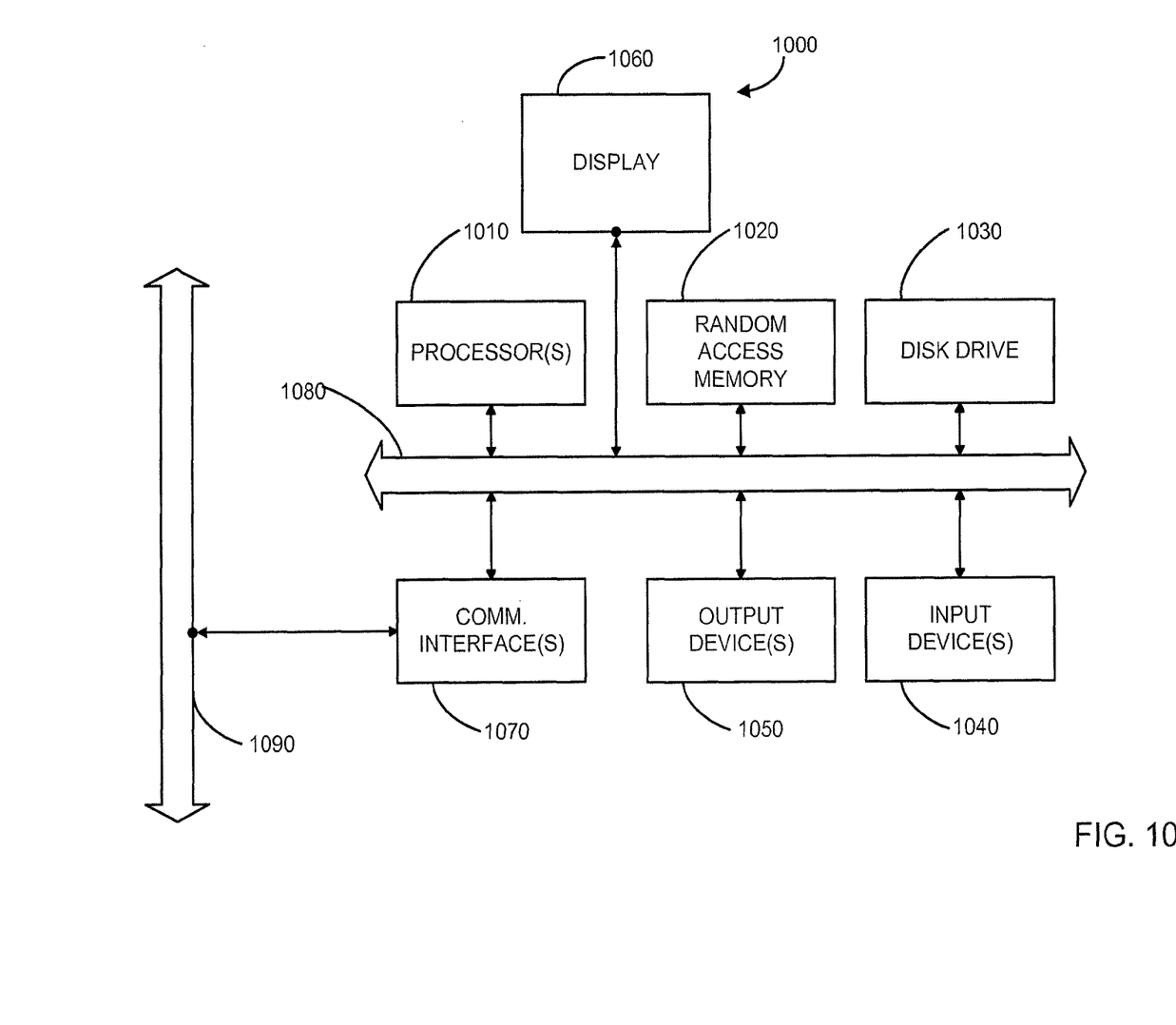
FIG. 10 is a simplified block diagram of a computer system that may incorporate embodiments of the present invention.

FIG. 10 is a simplified block diagram of a computer system 1000 that may incorporate embodiments of the present invention. FIG. 10 is merely illustrative of an embodiment incorporating the present invention and does not limit the scope of the invention as recited in the claims. One of ordinary skill in the art would recognize other variations, modifications, and alternatives.

In one embodiment, computer system 1000 includes processor(s) 1010, random access memory (RAM) 1020, disk drive 1030, input device(s) 1040, output device(s) 1050, display 1060, communications interface(s) 1070, and a system bus 1080 interconnecting the above components. Other components, such as file systems, storage disks, read only memory (ROM), cache memory, codecs, and the like may be present.

RAM 1020 and disk drive 1030 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMs, DVDs and bar codes, semiconductor memories such as flash memories, read-only-memories (ROMS), battery-backed volatile memories, networked storage devices, and the like.

In various embodiments, input device 1040 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 1040 may allow a user to select objects, icons, text, and the like, via a command such as a click of a button or the like. In various embodiments, output device 1050 is typically embodied as a display, a printer, a force-feedback mechanism, an audio output, a video component output, and the like. Display 1060 may include a CRT display, an LCD display, a Plasma display, and the like.

Embodiments of communications interface 1070 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 1090, to a FireWire bus, or the like. In other embodiments, these computer interfaces may be physically integrated on the motherboard or system board of computer system 1000, and may be a software program, or the like.

In various embodiments, computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 1000 may also include an operating system, such as Microsoft Windows®, Linux®, Mac OS X®, real-time operating systems (RTOSs), open source and proprietary OSs, and the like.

FIG. 10 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smartphone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A dock system comprising:
a first interface configured to receive an electronic device;
a second interface configured to receive an accessory; and
a base component coupling the first interface and the second interface, the base component configured to:
receive, from the accessory at the dock system, one or more preferences associated with the accessory; and
turn on, and/or change a setting of, one or more existing functionalities associated with the electronic device based on the one or more preferences by sending one or more commands to the electronic device via the first interface.

2. The dock system of claim 1, wherein the base component is configured to change the setting, and wherein the changed setting determines a format for content to be output from the electronic device.

3. The dock system of claim 1, wherein the base component is configured to turn on at least one of the one or more existing functionalities by selectively enabling and disabling a line out signal of the electronic device based on the one or more preferences.

4. The dock system of claim 1, wherein the base component is configured to turn on at least one of the one or more existing functionalities by generating one or more commands instructing the electronic device to initiate an echo cancellation program.

5. The dock system of claim 1, wherein the changed setting is a video setting of the electronic device.

6. A dock system comprising:
a first interface configured to receive an electronic device;
a second interface configured to receive an accessory; and
a base component coupling the first interface and the second interface, the base component configured to:
receive, from the accessory at the dock system, one or more preferences associated with the accessory, wherein the one or more preferences comprise at least one video preference; and
turn on, and/or change a setting of, one or more existing functionalities associated with the electronic device based on the one or more preferences, wherein at least one of the one or more existing functionalities associated with the electronic device is an existing functionality of the dock system.

7. The dock system of claim 6, wherein the base component is configured to modify signals received from the electronic device for outputting to the accessory in a manner defined by a changed setting of at least one of the one or more existing functionalities.

8. The dock system of claim 7, wherein the changed setting is a video setting, and wherein the video setting comprises at least one of an upsampling setting, a downsampling setting, a format setting, a timing setting, and a video effect setting.

9. The dock system of claim 7, wherein the base component is configured to modify a volume setting of the signals.

10. The dock system of claim 9 wherein the base component is configured to modify the volume setting based on a stored volume setting determined from the one or more preferences.

11. The method of claim 6, wherein the base component is configured to change the setting, and wherein the setting is a video setting, and wherein the video setting comprises at least one of an upsampling setting, a downsampling setting, and a timing setting.

12. A method for communicating between an accessory and an electronic device, the method comprising:
  detecting the presence of an accessory at a docking station that couples the accessory to an electronic device;
  receiving, from the accessory at the docking station, one or more preferences associated with the accessory; and
  turning on, and/or changing a setting of, one or more existing functionalities associated with the electronic device based on the one or more preferences by sending one or more commands to the electronic device.

13. The method of claim 12 further comprising:
  receiving information from the electronic device at the docking station in response to the set of preferences; and
  delivering the information to the accessory.

14. The method of claim 12 wherein turning on, and/or changing a setting of, the one or more existing functionalities includes changing the setting, wherein the changed setting is a video setting of the electronic device.

15. The method of claim 12 wherein turning on, and/or changing a setting of, the one or more existing functionalities includes changing the setting, wherein the changed setting determines a format for content to be output from the electronic device.

16. The method of claim 12 wherein turning on, and/or changing a setting of, the one or more existing functionalities includes turning on the one or more of the existing functionalities, wherein turning on the one or more of the existing functionalities includes selectively enabling and disabling a line out signal of the electronic device based on the one or more preferences.

17. The method of claim 12 wherein turning on, and/or changing a setting of, the one or more existing functionalities includes turning on the one or more of the existing functionalities, wherein turning on the one or more of the existing functionalities includes generating, at the docking station, commands instructing the electronic device to initiate an echo cancellation program.

18. A method for communicating between an accessory and an electronic device, the method comprising:
  detecting the presence of an accessory at a docking station that couples the accessory to an electronic device;
  receiving, from the accessory at the docking station, one or more preferences associated with the accessory, wherein the one or more preferences comprise at least one video preference; and
  turning on, and/or changing a setting of, one or more existing functionalities associated with the electronic device based on the one or more preferences, wherein at least one of the one or more existing functionalities associated with the electronic device is an existing functionality of the docking station.

19. The method of claim 18, wherein turning on, and/or changing a setting of, the one or more existing functionalities includes changing the setting, wherein changing the setting defines how the docking station modifies signals received from the electronic device for outputting to the accessory.

20. The method of claim 19, wherein the changed setting is a video setting, and wherein the video setting comprises at least one of an upsampling setting, a downsampling setting, a format setting, a timing setting, and a video effect setting.

21. The method of claim 19, wherein changing the setting includes modifying a volume setting at the docking station.

22. The method of claim 21, wherein modifying the volume setting comprises modifying the volume setting based on a stored volume setting determined from the one or more preferences.

23. The method of claim 18 wherein turning on, and/or changing a setting of, the one or more existing functionalities includes changing the setting, and wherein the setting is a video setting, and wherein the video setting comprises at least one of an upsampling, a downsampling setting, and a timing setting.

* * * * *